2,944,946
Patented July 12, 1960

2,944,946

CATALYTIC ELEMENT AND METHOD OF MANUFACTURING SUCH ELEMENTS

Bernard F. A. Lane, Clophill, and Gordon R. Strickland, Luton, England, assignors to D. Napier & Son Limited, London, England, a British company No Drawing. Filed May 4, 1956, Ser. No. 582,628

Claims priority, application Great Britain July 29, 1955

5 Claims. (Cl. 204—24)

This invention relates to catalytic elements for decomposing fluid and of the kind in which the catalyst is silver and the element comprises a coating of silver applied to a supporting or fundamental metal structure such as a metal gauze (hereinafter referred to as the supporting structure). The invention is particularly but not exclusively applicable to such catalytic elements for decomposing hydrogen peroxide for use with a fuel in a rocket motor. It may with advantage be applied to catalytic elements made by applying a layer of silver by a hot spraying process to a supporting structure, preferably in the form of perforated metal sheet or woven fabric or gauze or a mass of metal filaments of the kind sometimes called wire wool. A suitable, hot spraying process is described in Crum's U.S. patent application Serial No. 403,598, filed January 12, 1954, Patent No. 2,809,940, October 15, 1957.

An object of the invention is to provide a catalytic element of the kind referred to which will not only tend to have improved catalytic action on the appropriate liquid, assumed herein to be hydrogen peroxide, but will tend to have such action to a substantial degree from approximately the moment that the hydrogen peroxide is brought into contact therewith, thus reducing or eliminating the delay period often experienced between the first contact of the hydrogen peroxide with the catalytic element and the initiation of the catalytic action.

The method of producing a catalytic element of the kind referred to according to the present invention includes coating with silver a metal supporting structure, such as a gauze or the like formed of copper, nickel or other metal, in such a manner as to leave interstices in the silver through which a liquid in which the coated element is immersed can reach parts of the supporting structure, and treating the element so coated in an aqueous solution of ammonia in which silver oxide has been dissolved and whose concentration of silver is such that the metal of the supporting structure is anodic to silver in the solution.

Conveniently the supporting structure is formed of copper or nickel, copper being preferred.

The silver oxide may be dissolved in the aqueous solution of ammonia prior to the immersion of the coated element therein, but in a preferred method of producing a catalytic element of the kind referred to the supporting structure is coated with silver in the manner indicated, the coated element is then anodically treated so that silver oxide is formed upon the silver and the element is then treated in an aqueous solution of ammonia, into which solution silver oxide is dissolved from the surface of the silver to provide the appropriate silver content in the aqueous solution of ammonia.

When using such a method employing a supporting structure of copper the anodic treatment converts the surfaces of the silver and copper which are exposed, respectively to silver oxide and copper oxide, and it is believed that when the element is then immersed in ammonia, dissolution of both these oxides occurs giving a solution containing silver and copper as complex amines, and also re-exposing the copper surface, an immersion deposit of silver being then formed on the exposed copper surfaces by replacement with silver from the solution. Moreover, this silver deposit is found, on microscopic examination, to be arborescent and therefore to have a large surface area in relation to its dimensions.

As mentioned the invention is particularly applicable to the manufacture of catalytic elements of the kind referred to in which the silver is applied to the base structure by hot spraying. A complete process for the manufacture of such a catalytic element in which the supporting structure is in the form of copper gauze will now be described by way of example. The process comprises the following steps:

(1) Applying a gentle abrasive action to the copper gauze as by applying to it the known so-called "shot blasting" process, using for example thirty grade crushed grit (i.e. crushed grit conforming to British Standard Specification No. B.S. 2451, namely of a particle size that at least 88% will pass a screen of about 0.6 mm. mesh size and at least 88% will be retained on a screen of about 0.3 mm. mesh size).

(2) Dipping the abraded gauze, in a manner known per se, in a degreasing solution such carbon tetrachloride;

(3) Further degreasing the gauze in the hot vapour of a grease solvent and taking care that it does not subsequently become contaminated with any foreign matter;

(4) Hot spraying silver on to the degreased gauze;

(5) Anodising the silvered gauze in an alkaline carbonate solution.

(6) Washing the anodised gauze;

(7) Immersing the washed gauze in an aqueous solution of approximately 10% by weight of ammonia for 24 hours;

(8) Washing the ammonia-treated gauze in distilled water and drying it.

The gauze is then ready for use in a rocket motor or other device as a catalytic element for decomposing hydrogen peroxide, when it is found that it ensures satisfactory catalytic action substantially immediately upon contact of the hydrogen peroxide with the gauze.

Hitherto it has been proposed to subject catalytic elements of the kind in question to the action of hydrogen peroxide for a short period prior to their assembly in a rocket motor or the like in which they are to be used in order to ensure as far as possible their required immediate catalytic action on the hydrogen peroxide when operation of the motor is being initiated, and the present invention tends to render such prior activation of the catalytic elements by exposure to hydrogen peroxide unnecessary.

It is also found that catalytic elements manufactured in accordance with the method of the present invention tend to retain their catalytic action over longer periods of storage than catalytic elements not so manufactured.

It is to be understood that catalytic elements manufactured in accordance with the method set forth above are to be regarded as included within the scope of the invention.

What we claim as our invention and desire to secure by Letters Patent is:

1. A method of producing a catalytic element for decomposing fluid and consisting of a metal supporting structure and a coating of silver applied to said metal supporting structure, which comprises the steps of applying a coating of silver to said supporting structure leaving interstices extending through said silver coating to said supporting structure, then anodically treating said silver coated supporting structure in a bath of an alkaline carbonate solution to form silver oxide upon said silver coating, and then immersing the anodically treated structure in an aqueous solution of ammonia into which solution silver oxide dissolves from the surface of said silver coating and from which metallic silver is deposited in arborescent form on exposed areas of the metal of said supporting structure.

2. A method according to claim 1 in which said aqueous solution of ammonia contains approximately 10% by weight of ammonia.

3. A method of producing a catalytic element for decomposing fluid and consisting of a copper supporting structure and a coating of silver applied to said copper supporting structure, which comprises the steps of hot-spraying a coating of silver onto said copper supporting structure leaving interstices extending through said silver coating to said copper supporting structure, then anodically treating said silver coated supporting structure in a bath of an alkaline carbonate solution to form silver oxide upon said silver coating and copper oxide upon copper exposed beneath said interstices, and then immersing the anodically treated structure in an aqueous solution of approximately 10% by weight of ammonia into which solution silver oxide and copper oxide dissolve from said structure to form complex silver and copper amines to re-expose a surface of metallic silver having interstices through which metallic copper is exposed and from which solution metallic silver is deposited in arborescent form on said exposed areas of copper by displacement of copper by silver.

4. A method according to claim 1 in which the metal of said supporting structure is copper.

5. A method according to claim 1 in which the metal of said supporting structure is nickel.

References Cited in the file of this patent

UNITED STATES PATENTS

| | | |
|---|---|---|
| 2,239,954 | Fanselav | Apr. 29, 1941 |
| 2,315,141 | Tryon | Mar. 30, 1943 |
| 2,368,749 | Dowling | Feb. 6, 1945 |
| 2,424,083 | Finch et al. | July 15, 1947 |
| 2,446,132 | Evans | July 27, 1948 |
| 2,583,581 | Lukens | Jan. 29, 1952 |
| 2,615,930 | Moulton et al. | Oct. 28, 1952 |
| 2,664,363 | Meth | Dec. 29, 1953 |
| 2,689,191 | Pessel | Sept. 14, 1954 |
| 2,750,346 | Sherwood | June 12, 1956 |
| 2,809,940 | Crum | Oct. 15, 1957 |

FOREIGN PATENTS

| | | |
|---|---|---|
| 4,804 | Great Britain | Apr. 21, 1900 |